United States Patent
Monsen

[11] 3,712,136
[45] Jan. 23, 1973

[54] ARRANGEMENT FOR THE DETERMINATION OF LIQUID LEVELS

[75] Inventor: Per Reidar Monsen, Oslo 1, Norway

[73] Assignee: Navalco A/S

[22] Filed: Sept. 22, 1970

[21] Appl. No.: 74,262

[52] U.S. Cl. .....................73/290, 73/298, 137/81.5
[51] Int. Cl................................................G01f 23/16
[58] Field of Search ..............73/298, 290; 137/81.5; 116/118, 109, 112; 33/126.7 A

[56] References Cited

UNITED STATES PATENTS

| | | | |
|---|---|---|---|
| 3,277,914 | 10/1966 | Manion | 137/81.5 |
| 1,116,328 | 11/1914 | Rockwood | 116/112 |
| 2,865,320 | 12/1958 | Thiemann | 116/112 |
| 1,289,755 | 12/1918 | Haynes | 73/298 |
| 494,467 | 3/1893 | Donathen | 73/298 |
| 3,578,010 | 5/1971 | Campagnuolo | 137/81.5 |

Primary Examiner—Louis R. Prince
Assistant Examiner—Denis E. Corr
Attorney—Howson & Howson

[57] ABSTRACT

A fluidic level sensor in which a stream of energy fluid is alternatively diverted between two discharge channels by a control channel. One of the discharge channels is connected to an indicator, and the control channel is connected to a hollow probe which is adapted to have its free end closed by the surface of the fluid material being sensed. A branch channel is provided between the supply line of the fluid of the device and the control channel to permit the use of the supplied energy fluid to divert the stream into a selected discharge channel, the line is controlled by a pair of valves having a small hole therebetween opening to the atmosphere.

3 Claims, 1 Drawing Figure

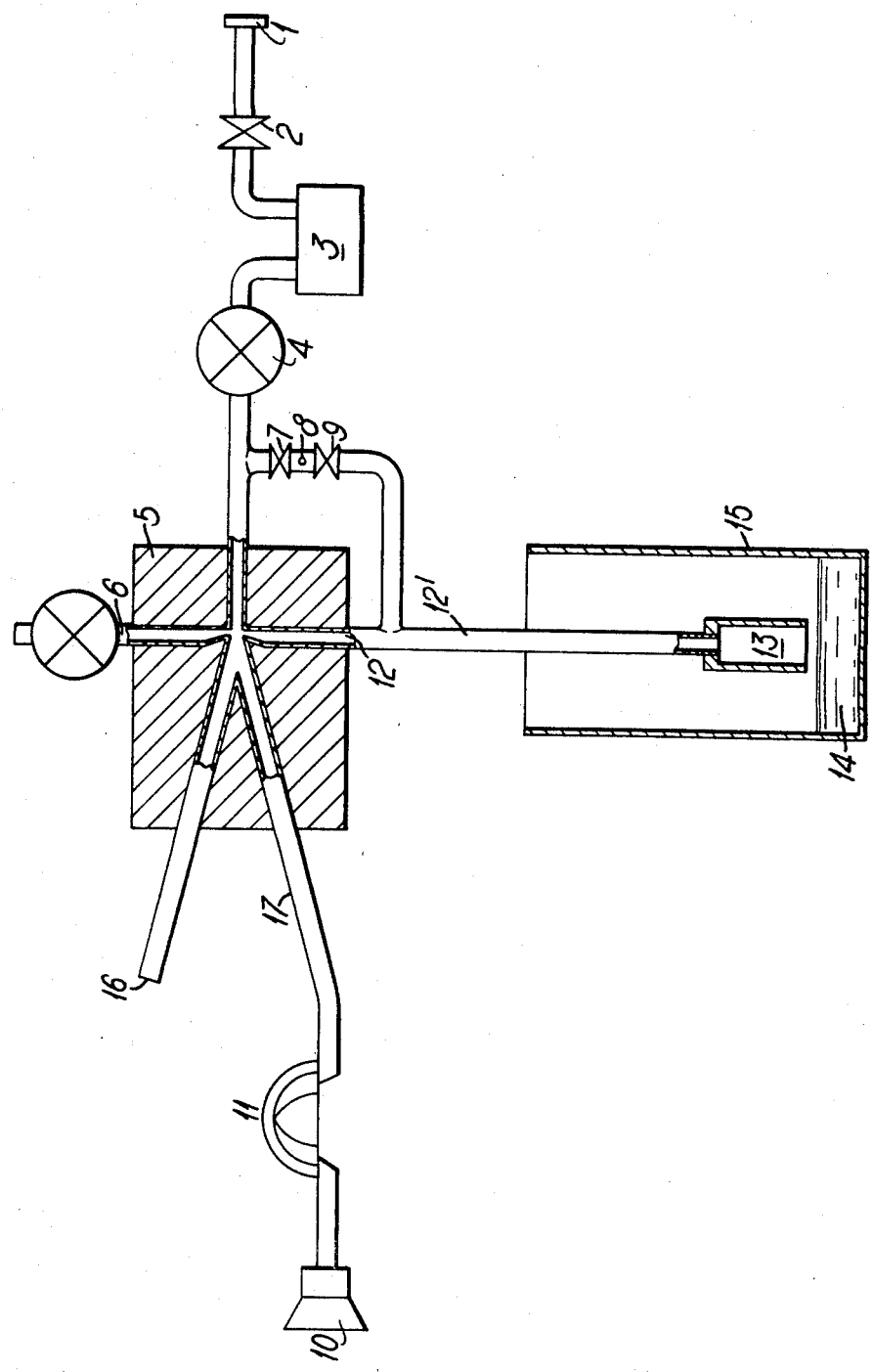

ARRANGEMENT FOR THE DETERMINATION OF LIQUID LEVELS

The present invention relates to an arrangement for the determination of liquid levels by means of a probe. When measuring the level of the liquid in tanks for instance bunker oil tanks on board ships where great risk is present for ignition of explosive gas mixtures it is undesirable to use liquid level measuring devices comprising electrical means. An electrical arrangement will have to be safeguarded against extern flashover or against technical failure which can result in ignition, and such safeguarding is very complicated as well as expensive and can hardly be made so that it satisfies the rigorous safety rules which are in force on board ships.

An object of the invention is to provide a liquid level measuring arrangement having a probe of such a kind that the abovementioned draw backs are fully eliminated. This is in accordance with the invention obtained by an arrangement of the type mentioned above which is characterized by a pressure sensitive member to which is connected a probe in the form of a tube, hose or the like, and alarm means, which pressure sensitive member changes its state when the free end of the probe is closed by the surface of the liquid whereby a pressure change arise in the tube, hose or the like and where the alarm means is sensitive as to change of state in the pressure sensitive member.

It is thus provided an arrangement comprising a probe which entirely eliminates risk of ignition of flammable gas mixtures by technical failure, the probe working in accordance with a pneumatic principle.

The invention now will be further described in connection with an embodiment in accordance with the invention schematically shown in the drawing.

A source of compressed air 1 feeds via a valve 2 a filter 3 and a reduction valve 4 air with desired working pressure for a boundary layer fluidistor 5. The fluidistor is bistable and is provided with a pair of opposed control stream channels 6 and 12, having discharge passages 16 and 17. To the control stream channel 12 is connected a tube or a hose 12', the lower end of which is provided with a probe 13 to measure the level of the liquid 14 in a container 15. To the control stream channel 6 is connected a reduction valve for the compensation of the flow resistance in the tube 12. This reduction valve discharges into the ambient air. In a branch channel between the inlet channel of the fluidistor and the control channel 12 are arranged valves 7 and 9 which can be of the automatically closing type. When the valves 7 and 9 are closed one will due to the small hole 8 in the wall of the branch channel maintain the atmospheric pressure between said valves so that a leak in the valves 7 and 9 will not result in increased pressure in the control channel 12. The outlet 16 of the fluidistor discharges into ambient air while the outlet 17 is connected to an optical alarm member 11 and an acoustic alarm member 10 which both are driven pneumatically.

The tube or hose can be provided with graduation which indicates the distance from the probe 13 which can be constituted by a metal probe having greater diameter than the tube or hose and serves as a lead for the lowering of the free end of the hose towards the liquid surface in the container. The greater diameter of the probe 13 prevents its clogging.

The arrangement has the following mode of operation: The valve 2 is opened so that air can flow through the fluidistor 5 and out through the outlet 16 or 17. The way chosen by the stream of air will be accidental. If air flows through the outlet 17 the valves 7 and 9 are opened. The hole 8 has so little diameter that the air through the valve 7 due to its great rate of flow will flow into the hose. The primer flow in the fluidistor is then controlled due to over pressure in the control stream channel 12 towards the outlet 16. The valves 7 and 9 are then closed, for example automatically, and the hose carrying the probe 13 is introduced in the tank or container 15 in which the level of the liquid 14 should be measured. When the probe arrives at the liquid surface, under pressure will be formed in the hose, and the primer stream through the fluidistor 5 is controlled towards the channel 17 whereby the alarm member 11 and 10 are activated. When the alarm is activated, one can read off the graduation of the hose which reading states the distance from the level of the liquid to the top of the tank.

After having read said distance the probe 13 is raised above the level of the liquid and valves 7 and 9 are opened. Thereby the primer stream through the fluidistor 5 is again controlled towards the outlet 16. The arrangement is now ready for a new descision of liquid level.

Air which can flow through the valves 7 and 9 serves also to blow through the hose 12 and the probe 13 to prevent clogging of these devices.

Even if the arrangement in accordance with the invention here is described using a fluidistor it will be understood that any kind of pressure sensitive means reacting on the closing of the free opening of the probe can be used. Further it is to be understood that any kind of alarm devices, or other type of signal means can be used for the registration of change as to state of the pressure sensitive member. Further in stead of the flexible hose one can use a rigid tube or a combination of tube and hose if so is desirable.

I claim:

1. An arrangement for the determination of the level of the surface of a free flowing material comprising a hollow probe having a free end adapted to be closed by said surface, a fluidistor onto which the pneumatic probe is connected, and an indicating device, which fluidistor changes its state when the free end of the probe is closed and a pressure change occurs in the probe, and which indicating device is activated by the said change of state in the fluidistor, characterized in that the fluidistor includes a conduit for connection with an energy stream from a separate source, two energy stream discharge channels to one of which the indicating device is connected, a control channel to which the probe is connected for selectively controlling the flow alternatively into said two discharge channels, a direct channel arranged between the conduit and the control channel and at least two valves spaced apart in said direct channel for controlling the admission of the energy stream into said control channel, and a small hole intermediate said valves to provide a passage for ambient air into said direct channel between said valves.

2. An arrangement according to claim 1, characterized in that the fluidistor comprises a bistable fluidistor having a second control channel and a reduction valve connected in said second control channel, at least one of said direct channel valves being also a reduction valve.

3. An arrangement according to claim 1 in which said control channel comprises a hose or tube, characterized in that the probe is constituted by a metallic sleeve having greater diameter than the diameter of the hose or tube.

* * * * *